May 23, 1967   E. F. POWELL   3,321,346
INNER TUBES FOR PNEUMATIC TYRES
Filed Jan. 6, 1965   3 Sheets-Sheet 1
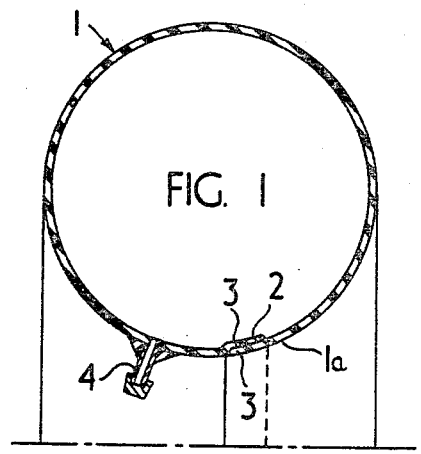
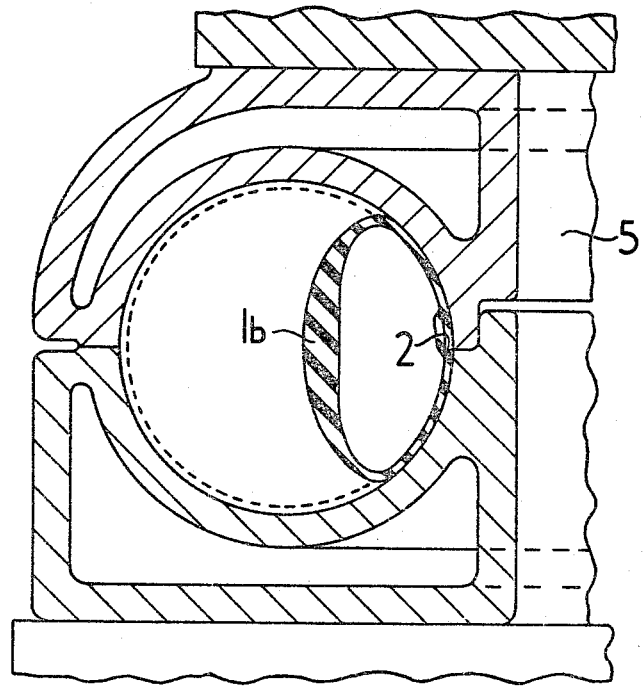

May 23, 1967  E. F. POWELL  3,321,346
INNER TUBES FOR PNEUMATIC TYRES

Filed Jan. 6, 1965  3 Sheets-Sheet 3

Inventor:
Ernest Frederick Powell
by Benj. T. Rauber
attorney

United States Patent Office 3,321,346
Patented May 23, 1967

3,321,346
INNER TUBES FOR PNEUMATIC TYRES
Ernest Frederick Powell, Wylde Green, Sutton Coldfield, England, assignor to Dunlop Rubber Company Limited, London, England, a British company
Filed Jan. 6, 1965, Ser. No. 423,735
Claims priority, application Great Britain, Jan. 21, 1964, 2,517/64
4 Claims. (Cl. 156—122)

This invention relates to inner tubes for pneumatic tyres.

According to the present invention an inner tube for a pneumatic tyre comprises a radially inner region for seating upon a wheel rim, and a single joint, said joint extending circumferentially around the tube in the radially inner region thereof, and the wall thickness of the tube, in the unvulcanised, unshaped, and unmoulded, state thereof, progressively increasing over at least a portion of the wall of the tube lying between the joint and the radially outer region of the tube so that, in the vulcanised, shaped, and moulded, state of the tube, the wall thickness of the tube remains substantially constant between the joint and the radially outer region.

According to the present invention also, a method of manufacturing an inner tube for a pneumatic tyre comprises extruding a tubular length of rubber or other plastic material, the wall thickness of said length increasing over at least a portion of the length between each end and a region intermediate the ends, turning at least one of the ends in a radial direction relative to the axis of said length so that the turned end lies wholly radially outwardly or inwardly of the remainder of the tubular length, moving said turned end axially towards the other end, joining said ends together to form an endless tube having a circumferentially-extending joint, and vulcanising the tube, the tube in its vulcanised, shaped, and moulded, state having a wall thickness which is substantially constant.

One embodiment of the invention will now be described by way of example, with reference to the accompanying drawings in which:

FIGURE 1 is an axial cross-section of an inner tube according to the invention,

FIGURE 2 is an axial cross section of part of a vulcanising mould showing an unvulcanised inner tube according to the invention in the uninflated and inflated conditions;

Figure 3:
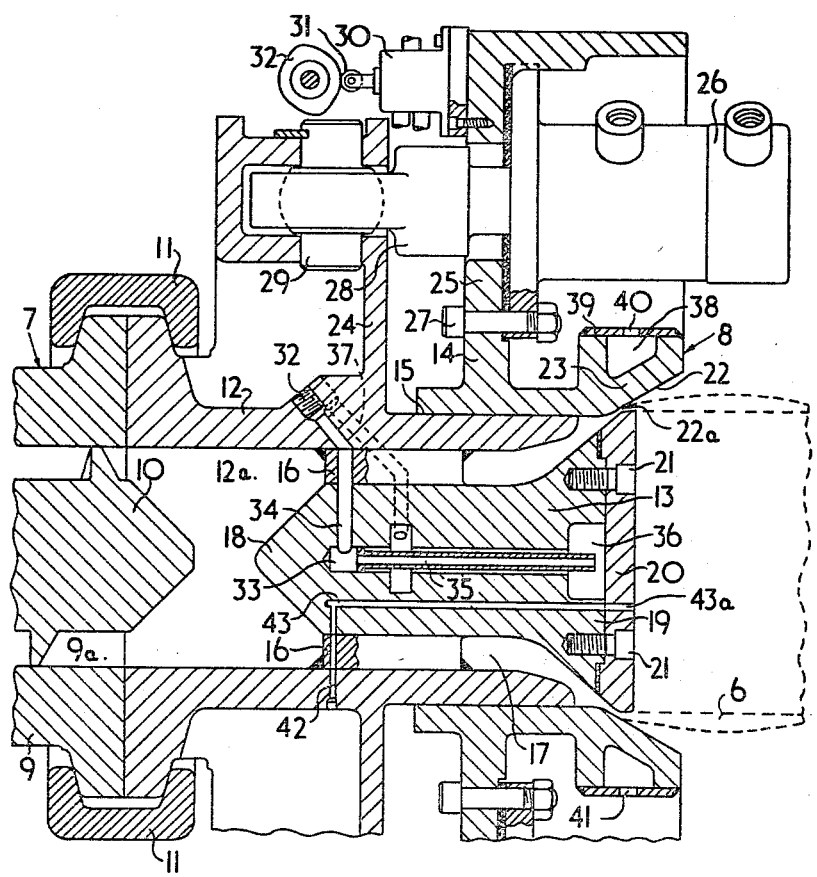
FIGURE 3 is an axial cross-section of part of an extruder used in the manufacture of the inner tube of FIGURE 1.

As shown in FIGURE 1, an inner tube 1 for a pneumatic tyre according to the present invention is constructed so that it comprises a single joint 2 which extends circumferentially around the radially inner region 1a of the tube and lies adjacent the mid-circumferential plane of the tyre. The joint is formed by the overlapping ends 3. An inflation valve 4 is located adjacent the joint 2. As shown in FIGURE 2, before inflation and vulcanization in a vulcanizing mould 5, the unvulcanised inner tube 1b has a wall thickness which increases progressively from the joint to the radially outer region of the tube. The rate at which the wall thickness increases is predetermined so that, when the inner tube is inflated in the mould, as shown by dotted lines in FIGURE 2, the wall thickness remains substantially constant from the joint to the radially outer region.

In use of the inflated tube within a tyre mounted on a wheel rim, because of its substantially constant thickness and the disposition of the joint in the region of the tube in contact with the rim, the tube has a substantially constant tensile strength throughout the whole of its regions in contact with the tyre.

The inner tube is manufactured from a short tubular length of rubber which has been severed from a continuous tubular length 6 extruded from a die box 8 (FIGURE 3) clamped to the outlet end of an extruder 7 by U-clamps 11.

The extruder 7 comprises a casing 9 and an extruder screw 10 rotatably mounted within an extruder passageway 9a formed within the casing 9, means (not shown) being provided for rotating the screw. The screw, during rotation, forces unvulcanised rubber from the extruder passageway into and through the die box 8 to form the continuous length of tube 6.

The die box 8 comprises a casing 12 formed with a passageway 12a therein forming an extension of the extruder passageway 9a, an inner die part 13 secured coaxially within the passageway 12a, an outer die part 14 axially movable with respect to the casing 12 and the inner die part 13, and means for moving the outer die part axially with respect to the inner die part.

The passageway 12a in the casing 12 has a diameter substantially equal to the diameter of the extruder passageway 9a. The casing 12 is provided on its outer peripheral surface at the axially outer end of the casing, i.e. the end remote from the casing 9, with an annular bearing surface 15 on which the outer die part 14 is slidably located. The casing 12 also comprises an annular flange 24 located axially inwardly of the bearing surface 15 and extending radially outwardly from the casing.

The inner die part 13 has a diameter somewhat less than the diameter of the passageway 12a and is coaxially secured within the passageway by four vanes 16 (only two of which are shown) to provide an annular passageway 17 through which unvulcanized rubber can flow.

One end 18 of the inner die part is provided with a torpedo-shaped nose to assist rubber flow and lies adjacent the end of the extruder screw 10, and the other end 19 projects beyond the axially outer end of the casing 12. The end 19 has a frusto-conical form having a maximum diameter greater than the diameter of the annular bearing surface 15. The extreme end portion 20 of the end 19 is removably secured to the remainder of the inner die part by set screws 21 to allow removal of the outer die part 14 from the bearing surface 15 for cleaning purposes or replacement with a part of different dimensions.

The outer die part 14 is formed with an internal bore of such a diameter that the die part is a sliding fit on the bearing surface 15 of the casing 12. The bore, formed in the axially outer end 23 of the outer die part, has a frusto-conical surface 22, which allows part of the end 23 to project beyond the end 19 of the inner die part. Thus in the assembled condition of the die box the outer die part is axially inwardly movable from a position in which the frusto-conical surfaces of the inner and outer die parts are in contact, towards the extruder. Upon axial movement of the outer die part towards the extruder an annular gap 22a is formed between the frusto-conical surfaces through which unvulcanised rubber may be extruded to form a tube.

An annular flange 25 is formed integrally with the axially inner end of the outer die part 14. The flange 25 extends radially outwardly parallel to the flange 24 on the casing 12.

Means are provided for moving the outer die part 14 axially with respect to the inner die part 13. Eight double-acting hydraulic cylinders 26 (only one of which is shown) are spaced equidistantly about the die box 8 and are fixedly located to the axially outer face of the flange 25 by nuts and bolts 27. Piston rods 28 associated with the cylinders 26 pass through holes provided in the flanges 24 and 25 and are axially located with respect to the flange 24 and the casing 12 by pins 29. A servo-valve 30 is secured to the flange 25 of the movable outer die part 13 and is provided with a cam-follower 31 which contacts the cam surface of a profile cam 32, fixedly located with respect to the casing 12. The cam profile controls the position of the double-acting cylinder with respect to its piston and thus the width of the annular gap between the frusto-conical surfaces of the inner and outer die parts by means of the servo-valve in known manner.

The cam profile also controls the rate of rotation of the extruder screw 10 so that when the gap 22a between the frusto-conical portions of the inner and outer die parts increases or decreases the rate of rotation of the screw increases or decreases, respectively, to force an increased or decreased amount of unvulcanised rubber through the gap.

The inner and outer die parts are steam-heated to ensure that the unvulcanised rubber flows easily through the die box. Steam is introduced into the inner die part 13 through an inlet passage 32 drilled in the casing 12. The inlet passage 32 is connected to an axial bore 33 provided in the inner die part by a passage 34 which passes through a vane 16 to the axially inner end of the bore 33. A pipe 35 having an external diameter less than the diameter of the bore 33 is located in the bore and is secured at its axially inner end to the wall of the bore so that steam cannot pass from the passage 34 between the pipe 35 and the wall of the bore. The axially outer ends of the bore 33 and of the pipe 35 open into a chamber 36. Steam is exhausted from the inner die part through an outlet passage 37 which extends from the bore 33, through a vane 16 and the casing 12. To heat the inner die part steam passes from a supply (not shown) through the inlet passage 32 and passage 34, and the pipe 35, to the chamber 36, and is exhausted from the chamber 36 through the annular passage between the wall of the bore 33 and the pipe 35 and the passage 37.

The axially outer end 23 of the outer die part is provided with annular groove extending around its outer peripheral surface. The groove is closed by an annular plate 39, which is welded to the portion 23 to provide an annular passage 38. The plate 39 is provided with two holes 40 and 41 diametrically opposed. To heat the outer die portion steam is passed from a supply (not shown) through the hole 40 around the annular passage 38 and is exhausted through hole 41.

Means are provided for coating the inner surface of the walls of the extruded tube with french chalk, or other suitable material to prevent the walls sticking together. The means comprises a supply (not shown) an inlet passage 42 extending radially through a casting 12 and a vane 16 into the inner die part and connected by an axially extending passage 43 to an orifice 43a in the axially outer surface of the inner die part.

In operation of the apparatus, the cam 32 is rotated at a constant rate and causes the outer die part 14 to reciprocate with respect to the inner die part 13 and the extruder screw 10 to rotate at a speed which varies with the size of the gap between the frusto-conical surfaces of the inner and outer die parts to ensure an adequate supply of rubber with the result that the continuous length 6 of unvulcanised rubber tube extruded has a plurality of positions, equally spaced apart axially, at which the thickness of the wall of the tube is relatively small, the thickness of the wall increasing progressively, in an axial direction, from each of these positions to a point midway between that position and the next adjacent position and then decreasing at a corresponding rate between the midway point and said next adjacent position.

After extrusion short lengths of tube are severed from the continuous length by a cutting knife (not shown). The tube is severed at the positions at which the wall thickness is relatively small. Thus, after severance, each short tubular length has a relatively thin wall at each end, the wall thickness increasing progressively from each end to a position midway between the ends.

Figure 4:
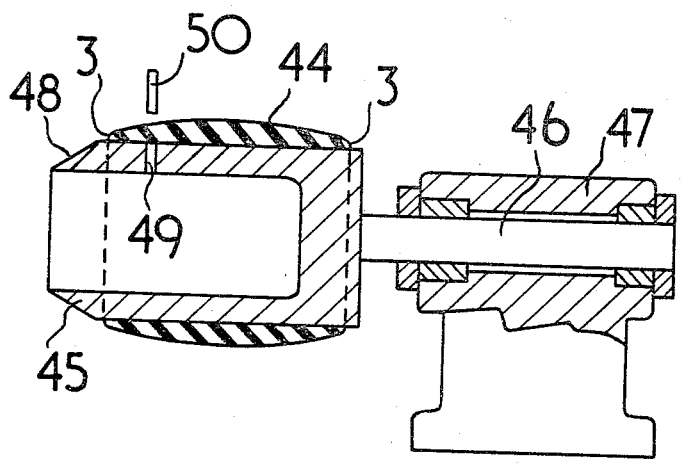
FIGURES 4 to 6 show different stages in the manufacture of the inner tube of FIGURE 1.

To form an inner tube from one of these short tubular lengths, the length, shown at 44 in FIGURE 4, is mounted upon a cylindrical supporting drum 45 which is carried upon one end of an axle 46 the other end of which is rotatably mounted within a framework 47. The free end 48 of the drum is of frusto-conical form and the drum is formed with a hole 49 which extends radially inwardly from the cylindrical supporting surface of the drum.

The diameter of the drum 45 is greater than the internal diameter of the tubular length 44 in the relaxed condition thereof, so that during fitting of the tubular length onto the drum, the frusto-conically shaped end 48 of the drum serves to stretch the material and to lead it onto the supporting surface of the drum. The tubular length is retained on the drum since, by virtue of its resilient nature, it grips the supporting surface.

After fitting the tubular length to the drum, a punch 50 is used to pierce a valve hole in the length, the punch passing into the hole 49 in the drum.

After dusting the outer peripheral surface of the tubular length with zinc stearate powder, the two ends 3 of the tube are turned radially outwardly and axially inwardly to bring them into overlapping relationship to form an endless tube (FIGURE 5), the overlapping ends forming a joint 2 in the radially outer region of the tube. A valve 4 is then secured to the tube in known manner in a position surrounding the hole formed by the punch 50.

Figures 5, 6:
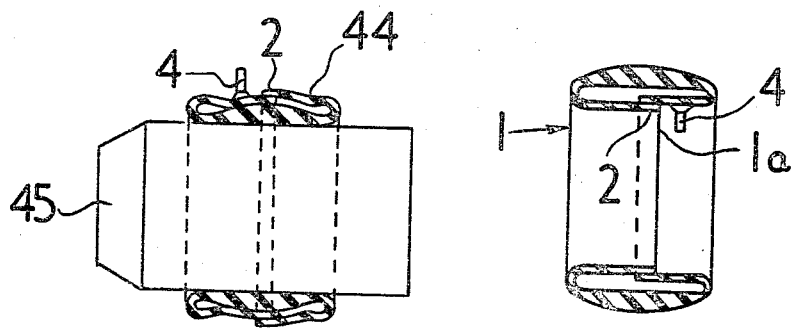

The endless tube 1 is removed from the drum 45 and is everted to the position shown in FIGURE 6 in which the joint 2 and valve 4 are located in the radially inner region 1a of the tube and the relatively thick portion of the tube is located in the radially outer region. The tube is then placed in the vulcanizing mould 5 (FIGURE 2) and inflated prior to vulcanizing in known manner. Inflation of the tube within the mould expands the radially outer regions of the tube radially outwardly, thus reducing the wall thickness in these regions, so that, in the vulcanized, shaped, and moulded, state of the inner tube, the wall thickness remains substantially constant from the radially inner to the radially outer regions of the tube.

Having now described my invention, what I claim is:

1. A method of manufacturing an inner tube for a pneumatic type having a single joint extending circumferentially around the tube comprising the steps of extruding a tubular length of rubber-like plastic material, the wall thickness of said length increasing over at least a portion of the length between each end and a region intermediate the ends, the diameter of said tubular length being less than the diameter of the radially outermost surface of the inner tube to be formed, turning at least one of the ends in a radial direction relative to the axis of said length, moving said turned end axially towards the other end, joining said ends together to form an endless tube having a circumferentially extending joint, expanding the wall portion of increasing thickness to an outer diameter at which the tube is to be molded, thereby thinning this wall portion to a uniform thickness and vulcanising the tube, the tube in its vulcanised, shaped, and moulded, state having a wall thickness which is substantially constant.

2. A method according to claim 1 comprising turning both ends of the tubular length radially outwardly, moving the ends axially towards one another, joining the ends to form the joint in the radially outer region of the endless tube so formed, and everting the tube to move the joint from said radially outer region to a radially inner region.

3. A method according to claim 2 wherein the tubular length is mounted upon a cylindrical supporting drum prior to turning the ends of the tubular length radially outwardly.

4. A method of forming an inner tube which comprises extruding a vulcanizable rubber composition to form a tube, the wall of which has successive alternate zones of greater and lesser thickness, severing said tube at said zones of lesser thickness to form annuli having a thicker mid portion and thinner portions at each side of said mid portion, turning said thinner end portions reversely to overlie said thicker portion with the end margins of said thinner portions overlapping to form an overlapping seam, everting said structure to a circumferentially seamless annular tube, inflating the annular tube thus formed to expand said thicker portion to reduce it to a uniform thickness contact an annular mold surface and vulcanizing the resulting structure.

References Cited by the Examiner

UNITED STATES PATENTS

| | | | |
|---|---|---|---|
| 1,504,653 | 9/1924 | Taylor | 156—122 X |
| 1,870,561 | 9/1932 | Fitzgerald | 156—118 X |
| 1,889,904 | 12/1932 | Roberts | 156—118 |
| 1,952,470 | 3/1934 | Stephens | 156—122 |
| 2,214,903 | 9/1940 | Ickes | 156—122 |
| 2,231,182 | 2/1941 | Eger | 152—349 |
| 2,550,193 | 4/1951 | Iknayan | 152—349 |
| 3,159,697 | 12/1964 | Tocci | 264—98 |
| 3,183,135 | 5/1965 | Berquist | 156—126 |
| 3,229,006 | 1/1966 | Nohl | 264—98 |

EARL M. BERGERT, *Primary Examiner.*

ARTHUR L. LA POINT, CLIFTON B. COSBY,
*Examiners.*

C. W. HAEFELE, *Assistant Examiner.*